United States Patent [19]
Clare et al.

[11] Patent Number: 6,007,130
[45] Date of Patent: Dec. 28, 1999

[54] VEHICLE HAVING STRUT ASSEMBLIES AND COLLAPSIBLE SUPPORT MEMBERS

[76] Inventors: Scott Clare, 3381 Shawn Ct.; Neil G. Long, 2630 Randall Way, both of Hayward, Calif. 94541

[21] Appl. No.: 09/329,594

[22] Filed: Jun. 10, 1999

Related U.S. Application Data

[60] Division of application No. 09/234,281, Jan. 19, 1999, which is a continuation-in-part of application No. 08/896,392, Jul. 18, 1997, which is a continuation-in-part of application No. 08/685,678, Jul. 24, 1996, abandoned, which is a continuation-in-part of application No. 08/506,893, Jul. 26, 1995, Pat. No. 5,567,000.

[51] Int. Cl.⁶ .................................................... B60N 3/12
[52] U.S. Cl. ................ 296/37.6; 296/183; 188/322.12; 188/322.5; 188/276; 188/274
[58] Field of Search ............... 188/322.12, 322.19, 188/322.5, 276, 274; 267/64.11, 64.12, 64.13; 296/24.1, 37.6, 37.1, 181, 183; 224/402, 403, 404

[56] References Cited

U.S. PATENT DOCUMENTS

| | | |
|---|---|---|
| 4,372,429 | 2/1983 | Marx ................................. 188/322.12 |
| 4,408,751 | 10/1983 | Dodson et al. .......................... 267/120 |
| 4,917,430 | 4/1990 | Lawrence ................................ 296/37.6 |
| 5,090,770 | 2/1992 | Heinrichs et al. ............... 267/64.12 X |
| 5,251,729 | 10/1993 | Nehl et al. ..................... 188/322.12 X |
| 5,303,969 | 4/1994 | Simnacher ............................. 296/37.6 |

*Primary Examiner*—Robert J. Oberleitner
*Assistant Examiner*—Pamela J. Lipka
*Attorney, Agent, or Firm*—L. E. Carnahan

[57] ABSTRACT

A strut assembly for retaining a section of a vehicle in open position, and may be of an insulated type, heated type, or insulated and heated type, for use in a variety of varying temperature applications. The strut assembly may be connected to a power source of a vehicle and include a thermostatic control for maintaining a coil or one or more heating strips mounted in the strut assembly at a desired temperature. A protective sleeve or boot is provided about the plunger of the strut assembly. The strut assembly may be mounted to retain hinged side panels of a vehicle bed in an open position, with the bed being provided with collapsible support members thereunder to provide added safety from side impacts.

19 Claims, 6 Drawing Sheets

6,007,130

VEHICLE HAVING STRUT ASSEMBLIES AND COLLAPSIBLE SUPPORT MEMBERS

RELATED APPLICATIONS

This application is a division of U.S. Application Ser. No. 09/234,281 filed Jan. 19, 1999, which is a Continuation-In-Part of U.S. Application Ser. No. 08/896,392 filed Jul. 18, 1997, which is a Continuation-In-Part of U.S. Application Ser. No. 08/685,678 filed Jul. 24, 1996, now abandoned, which is a Continuation-In-Part of U.S. Application Ser. No. 08/506,893 filed Jul. 26, 1995, now U.S. Pat. No. 5,567,000 issued Oct. 2, 1996.

BACKGROUND OF THE INVENTION

The present invention relates to vehicles, such as pickup trucks, sports utility vehicles, vans, and emergency vehicles, particularly to strut assemblies and a collapsible support system for such vehicles, and more particularly to a strut assembly that can be insulated, heated, or insulated and heated, and to a support system incorporating collapsible beams.

In recent years, a hidden storage system has been developed for installation in the side panels of vehicles, and wherein one or more sections of the side panels is hinged to provide access to the interior of a storage box positioned behind the side panels. Such a hidden storage system is described and claimed in above-referenced U.S. Pat. No. 5,567,000 and in Pat. No. 5,823,598 issued Oct. 20, 1998. It has been found that conventional strut assemblies which are utilized to retain the hinged side panel sections, truck lids, tail-gate window assemblies, etc. are not effective in extreme heat or cold. Also, it has been found that side impacts of a vehicle, such as referenced above, cause rupture of fuel tanks located beneath the floor of the vehicles, particularly in pickup truck beds.

The present invention involves an improved strut assembly which can withstand the heat or cold operating conditions, and provides a safety system for vehicle side impacts. The strut assembly of the present is insulated, heated and/or insulated and heated, with the heating obtained via the vehicle power supply. Heating strips are utilized which are thermostatically controlled. The safety system utilizes a plurality of beams which collapse when impacted on the ends thereof and are constructed to direct the force away from a fuel tank located beneath the beams. Thus, when these features are combined into a vehicle, they provide an advance in the art which enables use in various temperature conditions while providing an additional safety feature.

SUMMARY OF THE INVENTION

The present invention provides means for retaining hinged members of a vehicle in open position regardless of temperature conditions and means for providing a safety system for such vehicles.

A further object of the invention is to provide a strut assembly which may include an insulator, a heater, or both.

Another object of the invention is to provide a vehicle with safety means in the form of a collapsible beam assembly.

Other objects and advantages of the present invention will become apparent from the following description and accompanying drawings.

DETAILED DESCRIPTION OF THE INVENTION

The present invention may be incorporated into a hidden storage system, such as mounted in a bed of a pickup truck, and utilizes an improved strut assembly and a collapsible support assembly. While the invention is described and illustrated for use in a pickup truck bed, the invention can be utilized in other types of vehicles, such as those referenced above.

Figure 1:
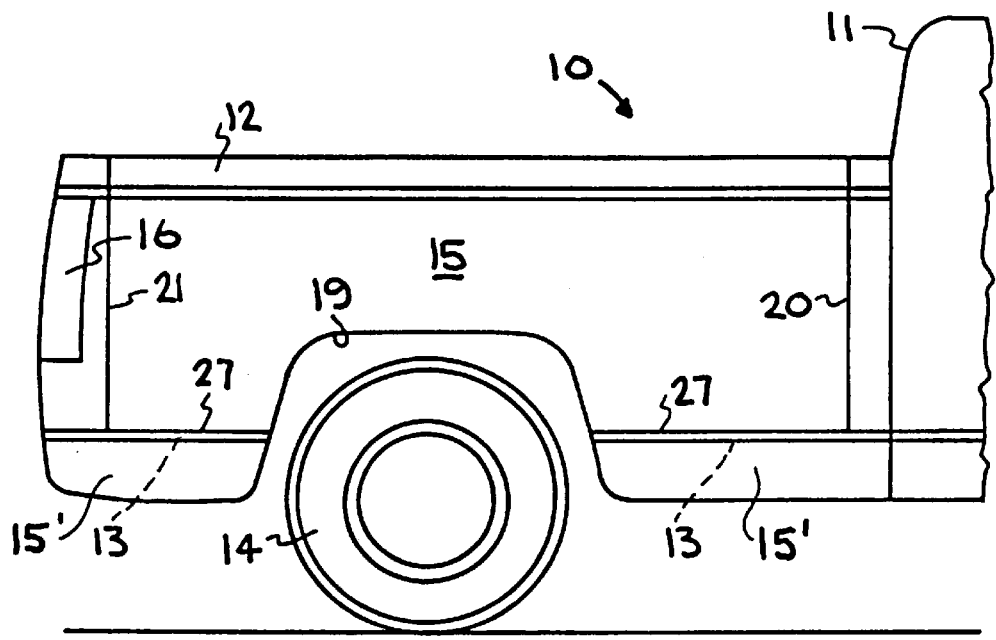
FIGS. 1 and 2 illustrate an embodiment of a vehicle with a hidden storage system incorporated therein.
Figure 2:
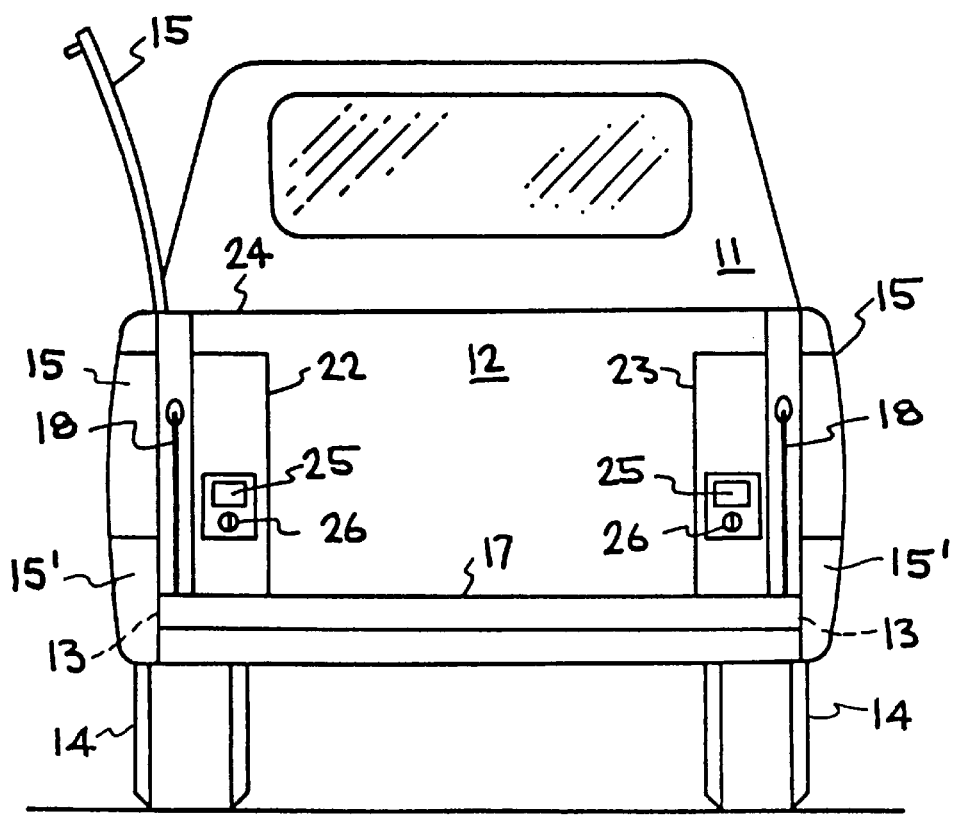

Referring now to the drawings, FIGS. 1 and 2 illustrate a conventionally appearing pickup truck, generally indicated at 10, having a cab 11, bed 12, frame or undercarriage indicated by dotted lines 13, and wheels 14. The bed 12 is mounted on frame or undercarriage 13 and includes side panels 15 and trim panels 151, a tail-light arrangement 16, a hinged tail-gate 17 with stop mechanisms 18, and wheel wells 19. However, the bed 12 of FIGS. 1 and 2 has been modified to incorporate a hidden storage system on both sides, with the only indication of such modification being cuts, small spaces, or lines 20 and 21 in the side panels 15, as shown in FIG. 1, with the side panel being closed. Note that in this embodiment the side panels 15 terminate adjacent the frame or undercarriage 13 as indicated by the line 27, and the trim panels 15' are not hinged, but may be if desired.

As seen in FIGS. 2, the hidden storage/utility area is provided by storage or structure boxes 22 and 23 mounted within the bed 12 and over the wheel wells 19, the boxes 22 and 23 being constructed to cover the wheel wells 19, but not extend to the top or upper surface 24 of bed 12, and terminate in spaced relation to tail-gate 17. Boxes 22 and 23 are secured, as by welding, bonding, etc. to the floor and side panels of the bed. A latch mechanism 25 is mounted in the rear of each of boxes 22 and 23, as seen in FIG. 2, and is provided with a key lock 26. The latch mechanism 25 includes latch members (not shown) located in spaced relation along the bed 12, and which cooperate with corresponding latch members (not shown) in side panels 15. While not shown, the latch members are interconnected by a rod or cable which is connected to mechanism 25, which includes a release for the latch members.

In another embodiment of the hidden storage system, the cut lines 20 and 21 of FIG. 1 were eliminated, and the hinged side panel 15 extends from the forward end of the bed 12 to the tail-light arrangement 16, and the only visible cut or line extends downwardly from the tail-light arrangement 16 to the lower edge of the hinged side panel 15 and upper edge of rear trim panel 15'. Also, in later embodiments, the tail-light arrangement 16 is hinged with side panel 15.

Figure 3:
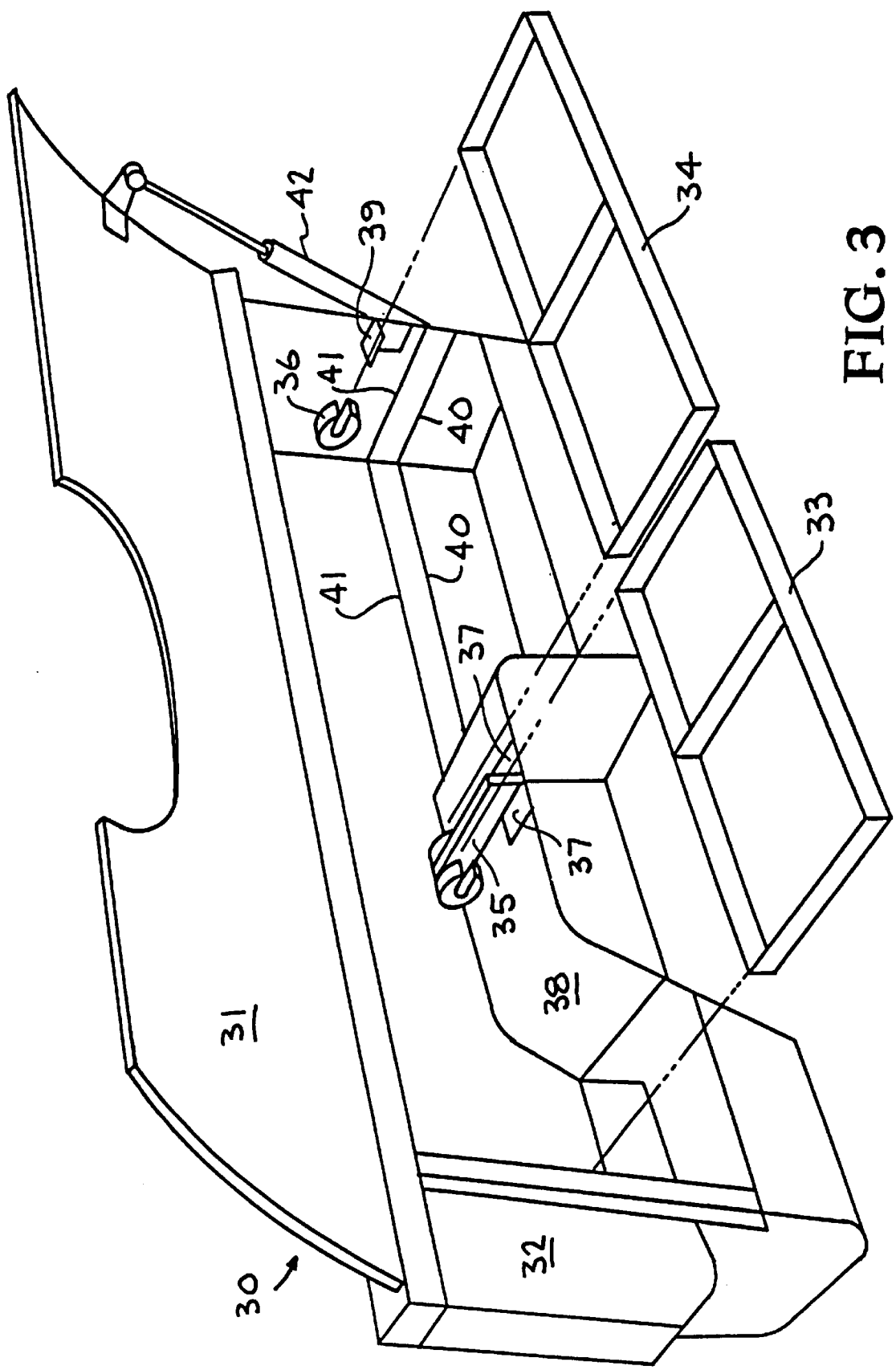
FIG. 3 illustrates a hidden storage system having a hinged side panel section retained open by a strut assembly.

As seen in FIG. 3, the side panel assembly 30, which includes a hinged panel section 31, includes a storage box 32 into which are slideably mounted shelves or box shelves 33 and 34, which are supported by a common support member 35 and a pair of end support members 36 (only one shown). The inner ends of slideable shelves 33 and 34 slide on members 37 secured to the wheel well 38, while the outer ends of shelves 33 and 34 slide on members 39 (only one shown) secured to ends of the storage box 32. The storage box 32 is additionally provided with shelf supports 40 and 41 on which a shelf, not shown, can be mounted whereby the height thereof can be adjusted for various uses. The hinged side panel section 31 is retained open by a strut assembly 42. If desired, support members similar to member 36 can be located at 40 and 41 to enable the use of additional sliding shelves. The embodiment of FIG. 3 may be fabricated as a modulator unit after which the hinged side panel and shelves are added.

Figure 4:
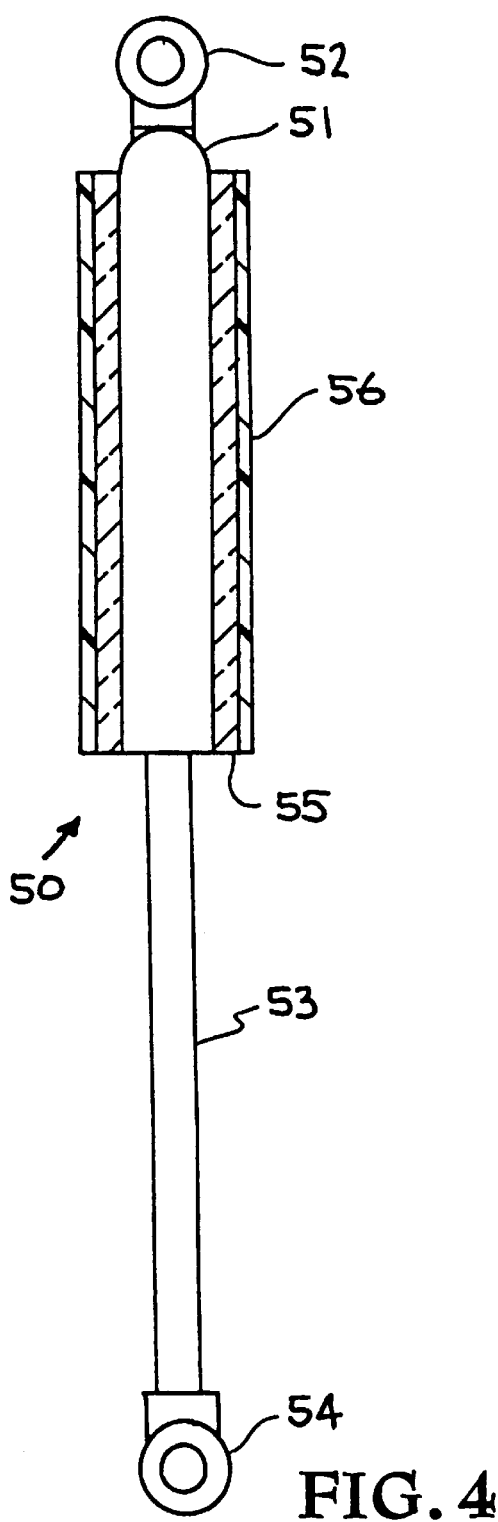
FIG. 4 illustrates an embodiment of a strut assembly made in accordance with the present invention.
Figure 5:
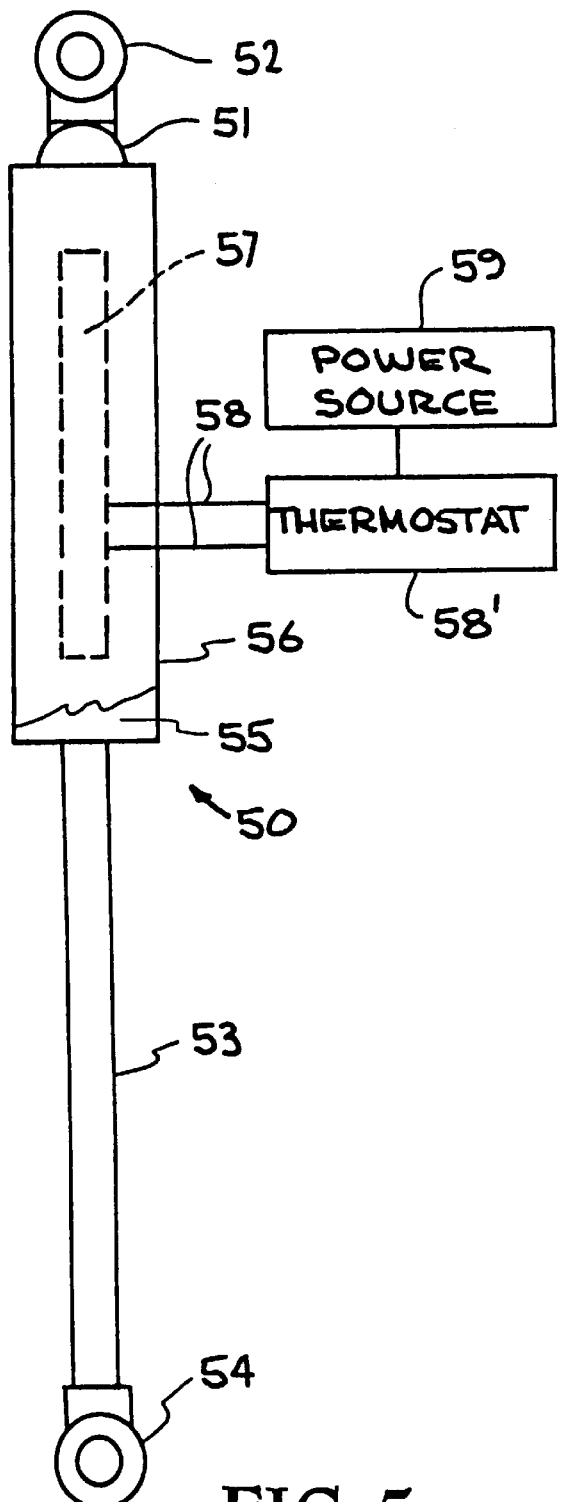
FIG. 5 illustrates another embodiment of the invention utilizing at least one heating strip, a power source, and a thermostatic control for the heating strip.
Figure 6:
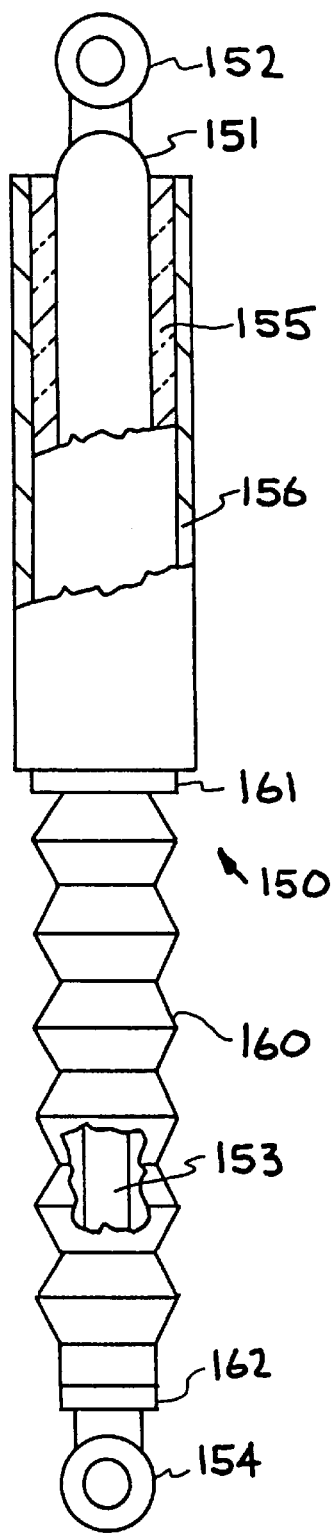
FIG. 6 illustrates an embodiment of a strut assembly similar to FIG. 4 and utilizing a protective boot.

As pointed out above, the upwardly opening side panels are provided with means for retaining same in open position, such as by conventional strut assemblies, widely used in the automotive field for retaining open rear windows or doors. However, hinges are also commercially available which are constructed to retain a door or window open, and thus could be utilized in the hinged side panels. The use of strut assemblies is generally preferred, but struts have disadvantages when operating in extreme temperature conditions, either hot or cold. This problem is resolved by the strut assemblies illustrated in FIGS. 4 and 5, wherein insulation and/or heating therefor is provided. FIG. 4 illustrates a conventional strut assembly with insulation about the body member, while FIG. 5 additionally illustrates an electrical heating strip for a conventional strut. However, the heating strip of FIG. 5 can be incorporated into the insulated strut assembly of FIG. 4. As shown in FIGS. 4 and 5, the strut indicated at 50 comprises a body member 51 having a connector member 52 at one end, and a plunger member or rod 53 having a connector member 54 reciprocally mounted in body member 51, and which is sealed in member 51, as known in the art. The body member 51/rod 53 may be provided with a conventional fluid or air arrangement which allows the rod 53 to be moved in or retained in the body member 51. In FIG. 4, the body member 51 is provided with a layer 55 of insulation material and a protective layer or sleeve 56 about the insulation layer. However, depending on the composition of the insulation layer 55, the protective sleeve or layer 56 may not be needed. In FIG. 5, which is constructed as in FIG. 4, the body member 51 is additionally provided with one or more electrical heating strips 57 (only one shown), which would be electrically connected via electrical leads 58 via a thermostat 58' to the power supply or source 59 of the vehicle on which the strut is utilized, or to a separate DC or AC power source. The electrical heating strip(s) 57 is positioned between the body member 51 and the insulation layer 55, whereby a heated/insulated strut is provided to withstand either extremely high or extremely low temperatures The heating strip(s) may be located within the insulation layer 55. However, the body member 51 may be provided only with one or more heating strips, if desired FIG. 6 illustrates the strut assembly of FIG. 4 with a protective boot, and the strut assembly is generally indicated at 150. The components of FIG. 6 which correspond to components 51–56 of FIG. 4 are identified as 151–156, respectively, with FIG. 6 illustrating a boot or sleeve 160 which is retained by annular bands, clamps or collars 161 and 162 to protect the end of body member 151 and the piston or rod 153 from contamination. The boot or sleeve 160, as shown, is of a collapsible accordian-type, and may be made of synthetic material, cloth, nylon, etc., and fabricated in any color available. The size of the protective sleeve or boot will vary in length and diameter depending on the piston size and length. The layer or sleeve 156 may be composed of hard or soft insulating material, which would replace the insulation layer 155, or merely function as a jacket over the insulation layer 155. The protective sleeve or boot 160 may be added to an existing strut assembly, such as shown in FIG. 4, or initially assembled with the strut assembly 150.

Figure 7:
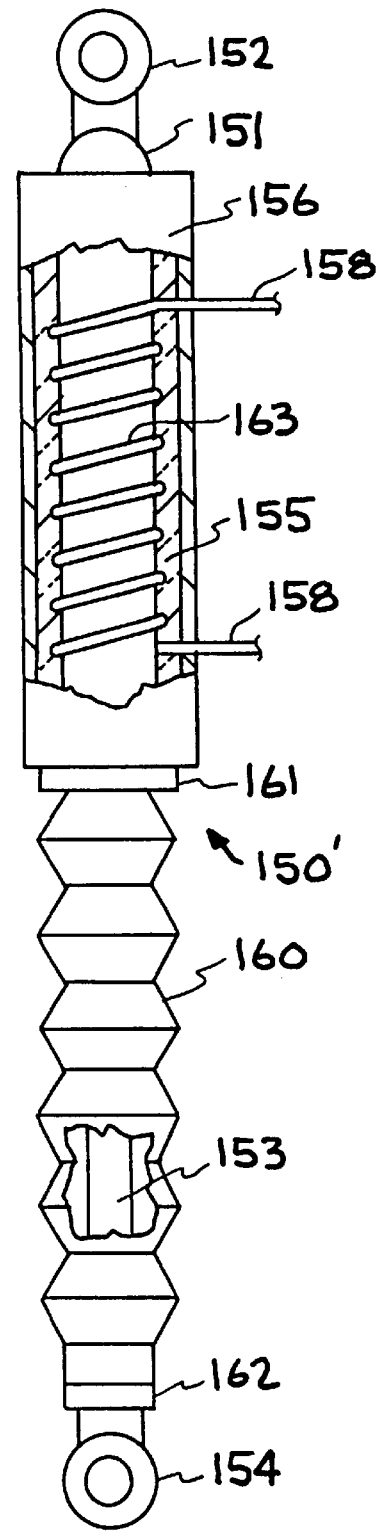
FIG. 7 illustrates an embodiment of a strut assembly similar to FIG. 5 but utilizing a resistive heating coil and a protective boot.

FIG. 7 illustrates a strut assembly generally indicated at 150' having the same components as the FIG. 6 embodiment, but incorporating a heating coil in place of the one or more heating strips of the FIG. 5 embodiment. Similar components are given corresponding reference numerals. The FIG. 7 embodiment utilizes a heating coil 163 having electrical leads 158 which may be connected to a thermostat and power source, as in FIG. 5. The coil 163 can be integrated with the insulation layer 155 instead of being around the body member 151, or the coil can be replaced by a layer of material which can be heated resistively by passing electrical current therethrough. As in FIG. 5, the power source may be of a DC or AC type, and may be composed of the 12 volt battery of the vehicle on which the strut assembly is mounted.

The hidden storage system, as illustrated in FIGS. 1–2, for example, may be provided with support/safety mechanisms, as illustrated in FIGS. 8–11, which comprise a pair of collapsible beams. Upon impact from a side of the storage/utility system, the beams collapse rather than bending, thereby preventing rupture or puncture of a fuel tank, typically located beneath the bed of a pickup truck.

Figure 8:
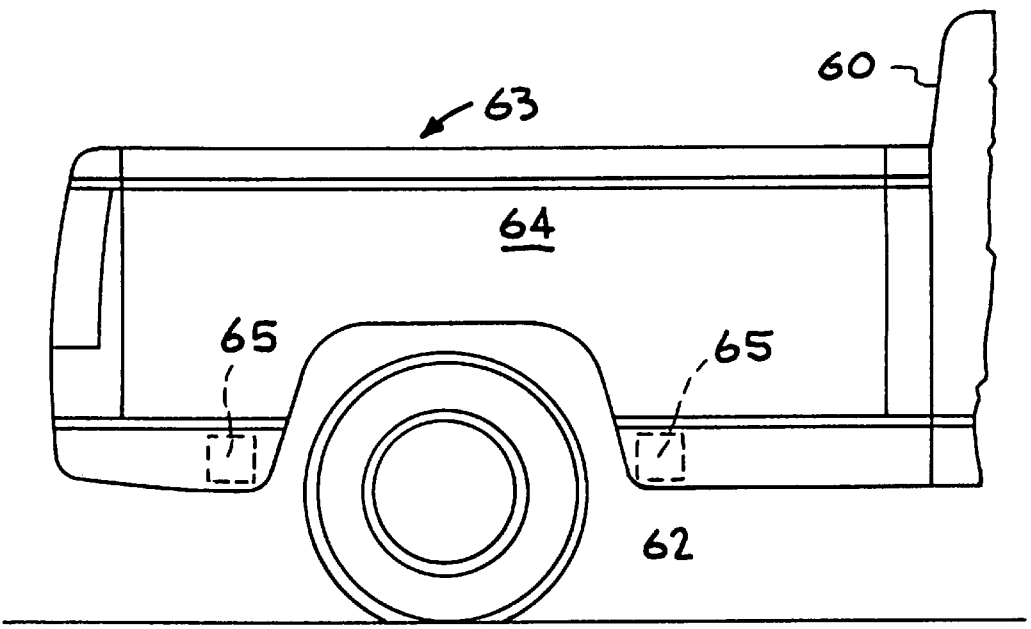
FIGS. 8–11 illustrate an embodiment of a collapsible support beam assembly for providing support for the bed of a pickup truck and providing protection for the fuel tank, typically located under the bed.
Figure 9:
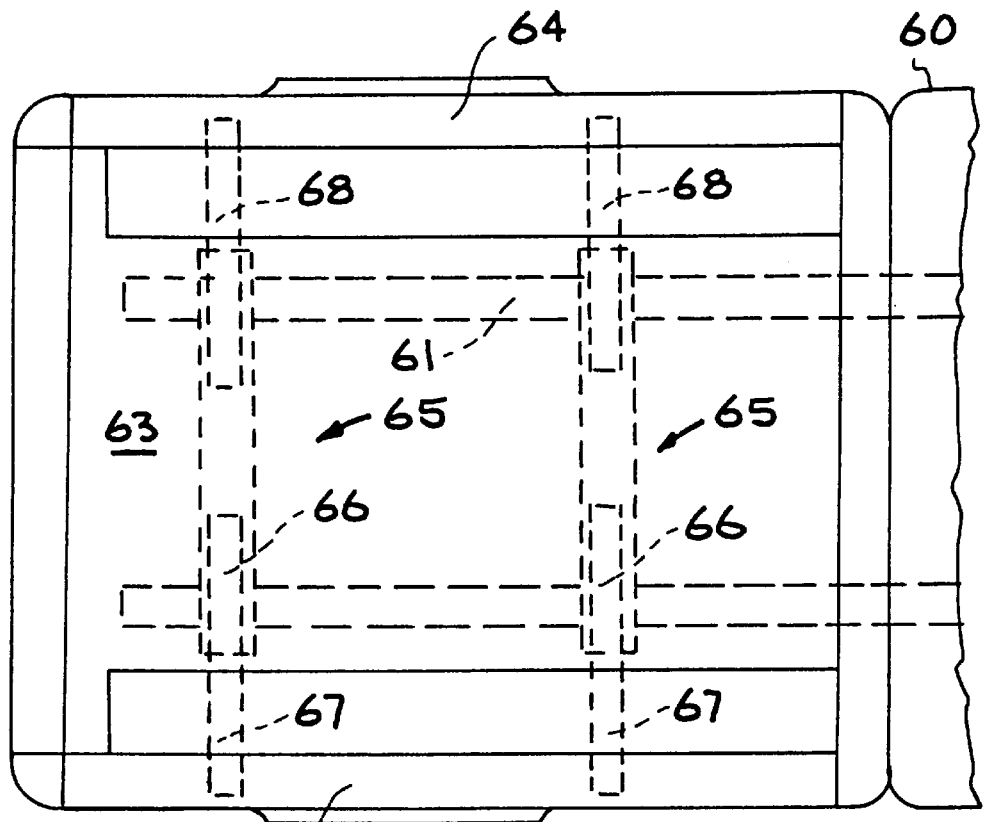
Figure 10:
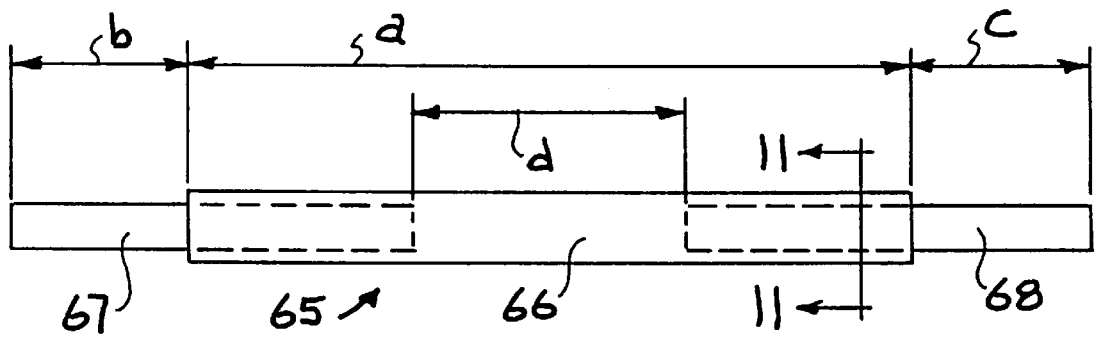
Figure 11:
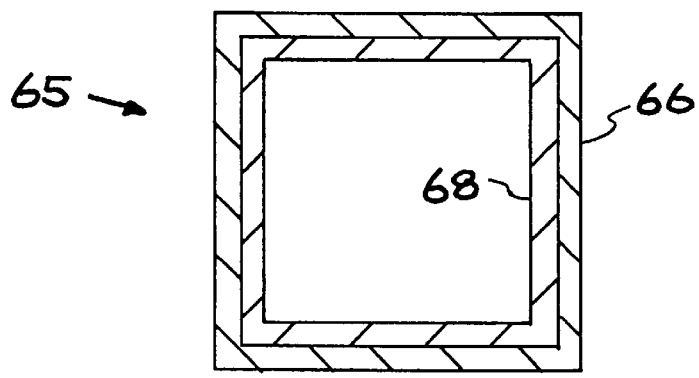

As seen in FIGS. 8 and 9, a vehicle 60, such as a pickup truck having frame members 61, wheels 62 (only one shown) mounted on an axle, not shown, is provided with a hidden storage bed 63 having side panels/fenders 64, such as illustrated in FIGS. 1-2. A pair of collapsible support beams 65 are mounted across the frame members 61 and extend outwardly so as to terminate inside the side panels/fenders 64. As seen in FIG. 10, each of the collapsible support beams 65 is composed of a central section 66 and end sections 67 and 68 that are constructed to extend into central section 66, a cross-section of the central section 66 and end section 68 is illustrated in FIG. 11, as taken along the line 11-11 of Figure 10. Beams 65 may also be rectangular, circular, etc. in configuration. As seen in FIG. 10, central section 66 of beam 65 has a length, a, while end sections 67 and 68 extend from central section 66 by a length, b and c respectively, with the inner ends of end sections 67 and 68 being separated by a distance, d. The length of a, b, c and d is determined by the width of bed 63. The end sections 67 and 68 may be spot welded, for example, at a desired point to central section 66.

The collapsible support beams 65 are constructed such that end sections 67 and 68 will collapse or slide into central sections 66 should either of the side panels/fenders 64 be impacted. By constructing the beams 65 to be collapsible, impact causes same to collapse rather than bend, such that a fuel tank mounted under bed 63 is not ruptured or punctured due to bending action of the support beams 65. Inasmuch as the bottom or floor of the bed 63 is mounted above the support beams 65, impact from the side will result in the floor bending upward, not downward, due to the support beams, thus also preventing rupturing or puncturing of a fuel tank by the bed floor. Thus, in addition to supplying support for the hidden storage bed 63, the support beams 65 provide a needed safety feature by protecting the fuel tank from impact.

While specific embodiments of the present invention have been described and illustrated, such are not intended to limit the invention to these embodiments. For certain applications, only one storage box and strut assembly may be desired. Beds for pickups, trailers, and trucks are designed with differently constructed side panels and frame/undercarriage arrangements. For example, the bed 12 of FIG. 1 may extend downward to cover the frame or undercarriage 13, as shown, and thus the side panels 15 would include the extended area of trim panels 15', or a cut, such as indicated at 27 in FIG. 1, can be made along a desired lower portion of the side panels 15 to eliminate the need for raising the entire side panel 15 and trim panels 15' when the extended area is part thereof.

Modifications and changes may become apparent to those skilled in the art, and it is intended that the invention be limited only by the scope of the appended claims.

What is claimed is:

1. In a vehicle having a hidden storage system mounted on a floor of the vehicle and having at least one hinged side panel section to provide the only access to the hidden storage system, the improvement comprising:

at least one strut assembly, including at least a body member, a plunger member, and means for heating said body member, said strut assembly being mounted to said at least one hinged side panel section.

2. The improvement of claim 1, additionally including a collapsible support structure mounted under said floor.

3. The improvement of claim 2, wherein said collapsible support structure includes a plurality of collapsible beams.

4. The improvement of claim 1, where in said at least one strut assembly includes an insulation layer about at least a portion of said body member.

5. The improvement of claim 4, additionally including at least one protective layer about said insulation layer.

6. The improvement of claim 5, wherein said means for heating said body member of said strut assembly includes a heating member located between said body member and said insulation layer.

7. The improvement of claim 1, wherein said electrical means for heating includes at least one electrical heating member selected from the group consisting of one or more heating strips and a heating coil, and means for directing electrical power to said heating member.

8. The improvement of claim 7, wherein said means for directing electrical power includes a power source and a thermostat.

9. The improvement of claim 8 wherein said power source comprises a battery of said vehicle.

10. The improvement of claim 1, additionally including a protective sleeve around a portion of said plunger member.

11. A vehicle bed including:

a floor section, a pair of side panel sections mounted to said floor section, each of said side panel sections have hidden storage therein with the only access thereto being via at least one hinged section in each of said pair of side panel sections, and at least one strut assembly located in each of said pair of side panels and mounted to retain said at least one hinged section in each of said pair of side panel sections in an open position, each said strut assembly including electrical heating means therefor.

12. The vehicle bed of claim 11, wherein each said strut assembly includes a body member, a plunger member, means for mounting said body member and said plunger member to a side panel section and to a hinged section thereof, and wherein said electrical heating means is positioned adjacent said body member.

13. The vehicle bed of claim 11, wherein said heating means includes at least one electrically heating member selected from the group consisting of one or more heating strips and a heating coil, and means for directing electrical power to said heating member.

14. The vehicle bed of claim 13, additionally including a thermostat for controlling the temperature of said electrical heating member.

15. The vehicle bed of claim 11, wherein said electrical heating means is powered by a source located on a vehicle on which said vehicle bed is mounted.

16. The vehicle bed of claim 15, wherein said source comprises a battery of said vehicle.

17. The vehicle bed of claim 11, wherein said strut assembly includes a protective boot.

18. The vehicle bed of claim 17, wherein said protective boot includes a flexible section and means for attaching said boot to said strut assembly.

19. The vehicle bed of claim 11, additionally including a collapsible support system for said floor section of said vehicle, said collapsible support system comprising a plurality of collapsible members mounted under said floor section.

* * * * *